United States Patent [19]

Presswood

[11] Patent Number: 4,631,298

[45] Date of Patent: Dec. 23, 1986

[54] MIXED DIAMINE CHAIN EXTENDER

[75] Inventor: J. Kenneth Presswood, Baton Rouge, La.

[73] Assignee: Ethyl Corporation, Richmond, Va.

[21] Appl. No.: 809,563

[22] Filed: Dec. 16, 1985

[51] Int. Cl.$^4$ ............................................. C08G 18/14
[52] U.S. Cl. ................... 521/163; 252/182; 264/51; 264/328.1; 264/328.6; 264/328.8; 528/76; 528/83
[58] Field of Search ................ 521/163; 528/76, 83; 252/182; 264/51, 328.1, 328.6, 328.8

[56] References Cited

U.S. PATENT DOCUMENTS

| T912,009 | 7/1973 | Strassel et al. | |
|---|---|---|---|
| 3,194,793 | 7/1965 | Kogon | 260/77.5 |
| 3,977,989 | 8/1976 | Taub | 252/182 |
| 4,218,543 | 8/1980 | Weber et al. | 521/51 |

FOREIGN PATENT DOCUMENTS

| 1070450 | 1/1980 | Canada. |
| 1158818 | 12/1983 | Canada. |
| 1148454 | 4/1969 | United Kingdom. |

*Primary Examiner*—Maurice J. Welsh
*Attorney, Agent, or Firm*—Donald L. Johnson; John F. Sieberth

[57] ABSTRACT

Mixtures of aromatic diamines, polyurethanes made therefrom, and processes for the preparation of the polyurethanes. The mixtures of aromatic diamines of the invention comprise a first aromatic diamine having a machine gel time of about 1 to 4 seconds in a 50,000 psi modulus RIM formulation reaction and the second aromatic diamine having a slower machine gel time of about 1.5 to 15 times that of the first aromatic diamine. The mixtures provide gel times of about 2.5 to 10 seconds, suitable for filling large molds such as automotive body panels. The novel aromatic diamine mixtures allow use of larger proportions of diamine to provide polyurethanes which are rigid but not brittle at demold and have unexpectedly superior flexural modulus properties. The polyurethanes formed with the chain extender mixtures of the invention have flexural modulus superior to polyurethanes formed from either of the diamines individually.

3 Claims, No Drawings

MIXED DIAMINE CHAIN EXTENDER

BACKGROUND OF THE INVENTION

The present invention relates in general to polyurea polyurethanes and in particular to chain extender mixtures for forming high flexural modulus polyurethanes. The invention is also related to reaction injection molding (RIM).

Diethyltoluenediamine and similar aromatic amines have been used, in a relatively pure form, as chain extenders in RIM and other polyurethane processes. The chain extender DETDA is commercially used and comprises a mixture of positional isomers having about 76% 1-methyl-3,5-diethyl-2,4-diaminobenzene and about 24% 1-methyl-3,5-diethyl-2,6-diaminobenzene (generally about 80:20). DETDA and its homolog triethyl m-phenylenediamine are used in RIM processes to provide polyurethanes having acceptable physical properties for molds of relatively limited size. The primary application of these diamines is in the automobile industry where automobile fascia and body panels of intermediate size are prepared.

In order to fill larger molds for large body panels such as doors, fenders, hoods, etc. for automobiles, it is necessary to provide a chain extender which has a somewhat slower gel time, can be handled without breaking at demolding ("green strength"), and has acceptable physical properties, especially heat distortion and impact strength. One of the most critical physical property measurements for large thin body panels and other large molded polyurethane products is flexural modulus measured in pounds per square inch (psi). The flexural modulus is typically measured at −20° F., 75° F. and 158° F.

There exists a need for providing a RIM process and a chain extender composition which provides a reaction injection mixture that has an appropriate gel time for filling large molds, has suitable properties at demolding, and has acceptable physical properties including flexural modulus.

In the past, attempts have been made to increase the flexural modulus of polyurethane parts by increasing the proportion of diamine that goes into the polyol resin mixture for reaction with a polyisocyanate. However, this has only resulted in polyurethane formed products which are brittle at demold and cannot be handled to be postcured at elevated temperatures. Furthermore, even if the brittle parts are postcured without handling the finished polyurethane products still retain some brittleness and are unacceptable when an excessive portion of the diamine is used in the reaction mixture.

SUMMARY OF THE INVENTION

Applicant has now discovered the use of certain mixtures of chain extenders which are especially suitable for RIM processes to fill large molds and provide polyurethanes having high green strength (not brittle at demolding) and excellent physical properties. The mixtures of the invention permit the use of increased amounts of diamine without producing brittle parts. According to the invention, a first aromatic diamine is blended with a second aromatic diamine which has a gel time somewhat slower than the first diamine so as to provide an acceptable gel time for filling large molds and still render a polyurethane product which has good green strength (not brittle at demold) and has acceptable physical properties. Unexpectedly and advantageously, the combination of chain extenders according to the invention provides a polyurethane which not only has acceptable gel time and good demold condition but also has enhanced flexural modulus and other physical properties.

It was unexpected that the aromatic diamine chain extenders which are usable with a RIM system could be mixed with a slower diamine to provide a chain extender mixture suitable in a RIM system. It was, rather, expected that the slower aromatic diamine would always take at least its known gel time to react and thus at least initially, a viscous mass would be present due to incomplete chain extension reaction. The apparent isocyanate index (NCO:[NH$_2$+OH]) would be too high and result in an inferior polymer, probably being too brittle in at least a portion thereof. However, it was surprisingly found that the mixtures of aromatic diamines according to the invention not only provide suitable gel times for filling large molds but also render polyurethane products which have good demold strength and unexpectedly high flexural modulus. Moreover, the mixture of diamines according to the invention permit the use of high ratios of equivalents of extender to equivalents of active hydrogen group-containing compound without producing brittle products.

DESCRIPTION OF THE PREFERRED EMBODIMENTS

A preferred embodiment of the present invention is a polyurethane formed by reaction of:
(a) an organic active hydrogen group-containing compound;
(b) an organic polyisocyanate; and
(c) a chain extender mixture comprising:
 (i) a first aromatic diamine having a machine gel time of about 1.0 to about 4.0 seconds in a 50,000 psi modulus RIM formulation reaction; and
 (ii) a second aromatic diamine having a machine gel time in a 50,000 psi modulus RIM formulation reaction of about 1.5 to 15 times the machine gel time of said first aromatic diamine;
said polyurethane having non-brittle, rigid green strength after reaction and having flexural modulus of at least about 50,000 psi at 75° F.

Another preferred embodiment of the invention is a process for preparing a RIM polyurethane molded product, said process comprising the steps of:
(a) at a temperature of about 15°–100° C., subjecting to static impingement mixing:
 (i) an organic polyisocyanate,
 (ii) an organic active hydrogen group-containing compound, and
 (iii) a chain extender mixture comprising a first aromatic diamine having a machine gel time of about 1.0 to 4.0 seconds in a 50,000 psi modulus RIM formulation reaction and a second aromatic diamine having a machine gel time in a 50,000 psi modulus RIM formulation reaction of about 1.5 to about 15 times the machine gel time of said first aromatic diamine, whereby a liquid mixture is produced;
(b) injecting a shot of said liquid mixture into a closed mold preheated to about 15°–100° C. and forming a polyurethane molded product having rigid, non-brittle green strength and a flexural modulus at 75° F. of at least about 50,000 psi;

(c) opening the mold and removing the formed polyurethane molded product; and (d) optionally, postcuring said molded product at 50°–200° C.

Still another preferred embodiment of the invention is a polyurethane RIM process comprising:

(a) at a temperature of about 15°–100° C. subjecting to static impingement mixing two liquid streams, a first stream comprising (i) an organic polyisocyanate or prepolymer or quasi-prepolymer formed from an organic polyisocyanate and an organic active hydrogen group-containing compound; and a second stream comprising (ii) either (1) an organic polyol having a molecular weight of about 400–7000 combined with a catalyst for reaction between hydroxyl groups and isocyanate groups, or (2) an amine terminated polyether or polyester; and (iii) a chain extender mixture of a first aromatic diamine selected from 2,2',6,6'-tetraisopropyl-4,4'-methylenebisaniline; 1-methyl-3,5-diethyl-2,4-diaminobenzene; 1-methyl-3,5-diethyl-2,6-diaminobenzene; 1,3,5-triethyl-2,6-diaminobenzene; and mixtures thereof; and a second chain extender selected from 1-methyl-3,5-dimethylthio-2,4-diaminobenzene; 1-methyl-3,5-dimethylthio-2,6-diaminobenzene, 2,2'-dichloro-4,4'-methylenebisaniline; and mixtures thereof, whereby a liquid mixture is produced, said mixture having a machine gel time in said process of about 2.5 to about 10 seconds;

(b) injecting a shot of said liquid mixture into a closed mold preheated to about 15°–100° C.;

(c) opening the mold and removing a molded product having rigid, non-brittle green strength and a flexural modulus at 75° F. of at least about 50,000 psi; and (d) optionally postcuring said product at 50°–200° C.; the amount of said chain extender mixture comprising about 5–40 weight percent of the total weight of components (i), (ii), and (iii) and the ratio of isocyanate groups to combined hydroxyl groups and amino groups being about 0.90 to 1.10.

According to a preferred embodiment of the invention a ratio of extender mixture aminos to active hydrogen groups is about 4:1 to 20:1, preferably 8:1 or more. This results in good polymers having high flexural modulus and good green strength.

The RIM process of the invention requires liquid components which can be combined to rapidly produce polymerization at low temperatures.

The process comprises separate feeding of active hydrogen group-containing compound and isocyanate-containing compound under very precise control with high pressure metering pumps into a mixing head where the liquid streams are mixed under very high velocity and then injected into a closed mold. An alternative method utilizes piston displacement of the liquids at controlled rates to meter the reactants into the mixing head.

Typically the mixing head is self-cleaning and mounted on the mold. It contains a relatively small, usually cylindrical, mixing chamber of the static impingement type where the liquid streams are mixed. The head usually has a valving mechanism that directs into the mixing chamber where the "shot" is made. The head usually has a piston to clean the mixing chamber and seal the mold after the shot is completed.

The diamine chain extender mixtures of the invention may be used in several of various conventional RIM equipment systems. Production can be carried out by a one shot or a prepolymer method. In the latter method, an organic active hydrogen group-containing compound, often a polyether or polyester polyol, or possibly an amine terminated polyether, of about 400 to 5,000 molecular weight is reacted with a stoichiometric excess of diisocyanate to produce a prepolymer. Chain extension is then carried out with a chain extender mixture of the type described herein. In the one shot method, an isocyanate stream is mixed with a stream containing the other components, including, where necessary for reaction between hydroxyl groups and isocyanate groups, a catalyst such as a dibutyl tin dilaurate catalyst.

Factors influencing the final properties are molecular structure, chain entanglement, and secondary bonding forces such as the hydrogen bonding and Van der Waals forces. These are controlled by selection of the molecular components employed. For example, typically each backbone exhibits its own advantages and disadvantges; e.g. polyether types display better resilience, lower heat buildup, better hydrolytic stability, good low temperature properties, and low processing viscosity. The polyesters, however, are tough, abrasion-resistant elastomers with better oil resistance and can be produced at lower costs. It should be noted that these comparisons are made with urethanes having the same hardness.

The polyisocyanate components of the invention may be selected from organic isocyanates including aliphatic, cycloaliphatic, araliphatic, aromatic, and heterocyclic polyisocyanates among others. "Organic polyisocyanate" includes prepolymers and quasi-prepolymers of polyisocyanates. Examples of polyisocyanates include ethylene diisocyanate, tetramethylene-1,4-diisocyanate; hexamethylene-1,6-diisocyanate, dodecane-1,12-diisocyanate; cyclobutane-1,3-diisocyanate; cyclohexane-1,3-diisocyanate and cyclohexane-1,4-diisocyanate (and mixtures of these isomers); 1-isocyanato-3,3,5-trimethyl-5-isocyanatomethylcyclohexane; hexahydrotolylene-2,4-diisocyanate; hexahydrotolylene-2,6-diisocyanate (and mixtures of these isomers); hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; phenylene-1,3-diisocyanate; phenylene-1,4-diisocyanate; tolylene-2,4-diisocyanate and tolylene-2,6-diisocyanate (and mixtures of these isomers); diphenylmethane-2,4'-diisocyanate; diphenylmethane-4,4'-diisocyanate; naphthylene-1,5-diisocyanate; triphenylmethane-4,4',-4"-triisocyanate; polyphenyl-polymethylene polyisocyanates; meta and para isocyanatophenylsulfonylisocyanates; perchlorinated aryl polyisocyanates; polyisocyanates having carbodiimide groups; polyisocyanates containing allophanate groups; polyisocyanates containing isocyanurate groups; polyisocyanates containing urethane groups; polyisocyanates containing acylated urea groups; polyisocyanates containing biuret groups; polyisocyanates prepared by telomerization reactions; polyisocyanates having ester groups; reaction products of the above-mentioned isocyanates with acetals; polyisocyanates containing polymeric fatty acid groups; 1,3,5-benzenetriisocyanate; polyarylpolyalkylenepolyisocyanates such as polymethylenepolyphenylisocyanate; isocyanates prepared by the phosgenation of the reaction product between aniline and formaldehyde having a functionality of about 2.2 to about 3.5; and others.

As a general rule, it is preferred to use readily available polyisocyanates such as diphenylmethane-4,4'-diisocyanate (MDI) and polyisocyanates containing carbodiimide groups, urethane groups, allophanate groups, isocyanurate groups, urea groups, or biuret groups or mixtures of any of the above. Available commercial polyisocyanates are Mondur ® PF isocyanate (Mobay Chemical Co.) and Isonate ® 143L polyisocyanate (Dow Chemical Company).

The component of the polyurethane reaction mixture described herein as an organic active hydrogen group-containing compound is typically a polyether diol or a polyester diol. However, the organic active hydrogen group-containing compound may be an amine terminated polyether (including amine terminated polyesters) or a similar component suitable for reaction with the polyisocyanate component. Typically, the polyols contain about 90% of the hydroxyl groups present as primary hydroxyls.

The polyether polyols useful for the invention are made by polymerization of cyclic ethers such as ethylene oxide, propylene oxide, butylene oxide, tetrahydrofuran, and the like. These cyclic ethers can be used individually or as mixtures or in successive fashion when making a polyether. For example, when it is desired to prepare a polyether polyol with a predominance of hydroxyl groups bonded to primary carbon atoms, it is known that such materials can be made by initially polymerizing propylene oxide and/or a higher oxide and then reacting the intermediate thereby produced with ethylene oxide. The organic compounds typically have at least two primary hydroxyl groups (or amine terminal groups) and a molecular weight of from about 400 to about 12,000, more preferably from about 400 to about 7,000 (often 5,000). Typically, the polyethers are made by polymerization of ethylene oxide alone or as a mixture with propylene oxide, butylene oxide, THF, or the like or in succession addition. Polythioethers, polyacetals, polycarbonates, polyester amides and polyamides, and other polyhydroxyl compounds may also be used.

The amine terminated polyether resins are useful for the invention. These resins may be made from an appropriate initiator to which lower alkylene oxide such as ethylene oxide, propylene oxide, butylene oxide, or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of the hydroxyl groups are replaced by amine groups.

Therefore the amine terminated polyether resins useful in this invention generally have greater than 50% of the active hydrogens in the form of amine hydrogens. If ethylene oxide is used it is desirable to react the hydroxyl terminated polyol with a small amount of higher alkylene oxide to ensure that the terminal hydroxyl groups are essentially all secondary hydroxyl groups. The polyols are thereafter reductively aminated. Available amine terminated polyols are the Jeffamine ® polyoxyalkylene amines from Texaco Chemical Company. These include the D-230, D-400, D-2000, and D-4000 amine terminated polypropylene glycols; the ED-600, ED-900, ED-2001, ED-4000, and ED-6000 polyether diamines with a predominately polyethylene oxide backbone; the T-403, T-3000, And T-5000 propylene oxide based triamines of Texaco; and others.

Suitable polyesters containing hydroxyl groups include, e.g. reaction products of polyhydric (preferably dihydric) alcohols, optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic, and/or heterocyclic and they may be substituted, e.g. by halogen atoms, and/or may be unsaturated. Exemplary compounds include succinic acid, adipic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, dimeric and trimeric fatty acids such as oleic acid. Exemplary polyhydric alcohols include ethylene glycol, propylene glycol, butylene glycol, hexanediol, octanediol, neopentyl glycol, cyclohexane dimethanol, 2-methyl-1,3-propanediol, glycerol, trimethylolpropane, hexanetriol, butanetriol, trimethylolethane, pentaerythritol, mannitol, sorbitol, methyl glycoside, diethylene glycol, triethylene glycol, dipropylene glycol, polypropylene glycol, dibutylene glycol, polybutylene glycols, and the like. The polyesters may also contain a proportion of carboxyl end groups. Polyesters of lactones may also be used. The polyesters have at least 2 and generally from 2 to 8, preferably 2 or 3, hydroxyl groups.

The organic active hydrogen group-containing compounds thus include polyethers, polyhydroxy polyols, amine terminated polyethers, (including polyesters) and other compounds. They are sometimes referred to as having isocyanate reactive hydrogens or Zerewitinoff active hydrogens. Of course, such a description may also refer to the hydrogens of the diamine chain extenders.

Release agents generally known in the art as "external mold release agents", such as silicon oils, are frequently used when carrying out a cast elastomer process and also for certain RIM processes. Various "internal mold release agents" may also be used.

The quantities of reactants used to make a polyurethane according to the invention is such that the number of —NCO functions is substantially the same as the combined amino groups of the chain extender and active hydrogen groups of the active hydrogen group-containing compound. That is, the quantities of reactants used in the process according to the present invention are generally adjusted so that the ratio of isocyanate groups to combined active hydrogen groups and chain extender amine groups is from about 0.8 to about 1.2, sometimes larger depending on the particular procedure employed.

Typically, with quasi-prepolymers in a RIM process, the isocyanate content of the quasi-prepolymer is from about 10 to 20 weight percent. With non-prepolymer formulations, the isocyanate content by weight is much higher, e.g. 20–40 weight percent or more. The combined active hydrogen groups and amino groups (from the diamine extender) must accordingly comprise a total equivalent amount about equivalent to the isocyanate functions.

The ratio of isocyanate-reactive aminos of the chain lengthening mixture of the invention to the reactive hydrogens of the active hydrogen group-containing compound may vary over a broad range. A typical broad range is from about 4:1 to about 20:1. In the typical contemporary formulation, the ratio (from a single, fast chain extender) is about 7:1. In a preferred embodiment of the invention the ratio is raised to at least about 8:1, more preferably 9:1 to increase the flexural modulus of resulting polymers. The chain extender generally comprises from 5–40 weight percent, preferably 10–20 weight percent, more preferably 12–20 weight percent of the reaction mixture for the elastomer.

The chain extender mixtures of the present invention may be mononuclear, dinuclear, polynuclear, or mixtures of these. In addition to the active hydrogen group-containing compound, the isocyanate-containing compound, and the chain extender of the invention, the elastomer compositions of the invention may also include other materials commonly employed in making polyurethane products. These include blowing agents such as water, and volatile organic substances such as freons like monofluorotrichloromethane, chlorodifluoromethane and the like. The polyurethane may also contain additional components such as a flame retardant, an emulsifier, a dye, cell regulator, bacteriostatic agent, mold release agent, or the like. Fillers may also be included.

A catalyst may comprise from about 0.00001 to 10 weight percent, preferably from about 0.001 to about 1.0 weight percent of the total reaction mixture. Tin compounds are typically used as catalysts.

The first, faster diamine component of the chain extender mixture of the invention is selected from those diamines having a machine gel time of 1 to 4 seconds in a 50,000 psi modulus RIM formulation reaction. By "machine gel time", I mean the time from mixing the polyurethane reaction components to the beginning of gelation. This gelation may be determined by flow properties or viscosity increase. The viscosity level for the beginning of gelation of the reaction mixture is about 10 times greater than the liquid reaction mixture at the time of mixing. The initial fluid mixture is usually in the range of about 200 to 300 centipose.

By "50,000 psi modulus RIM formulation", I mean those RIM formulations having two streams, the first stream having (a) about 77 parts by weight of a polyether having a hydroxyl number of 28 and obtained by addition of propylene oxide and subsequent addition of ethylene oxide to trimethylolpropane, such polyethers usually having a molecular weight of about 3,000–7,000, more usually 4,000;
(b) 0.1 part by weight of an organic tin catalyst;
(c) 0.1 part by weight of a tertiary amine catalyst; and
(d) about 23 parts by weight of an active aromatic diamine whose equivalent weight is about 87.5;

and the second stream having about 58 grams per 100 grams of the first stream of a modified polyisocyanate produced by reacting tripropylene glycol and 4,4'-diphenylmethane diisocyanate, having an NCO content of about 23 percent by weight.

This formulation has about 87.2% of the isocyanate-reactive hydrogen equivalents from the chain extender and only about 12.8% from the active hydrogen group-containing polyether compound (7.3:1 ratio).

A reaction mixture with an isocyanate index of 100 has 100 isocyanate groups per 100 combined active hydrogen groups and extender amines. The 50,000 psi modulus RIM formulation uses an isocyanate index of about 90 to 110, usually 95 to 105, preferably 100 to 105 and has a ratio of about 0.0385 equivalents of the polyether and 0.263 equivalents of the diamine to react with the 0.315 equivalents of isocyanate.

The chain extender mixtures of the invention include a first chain extender having a faster machine gel time in a 50,000 psi modulus RIM formulation than does the second diamine. Generally, the first diamine has a machine gel time of at least about twice that of the second diamine, preferably about 1.5 to about 15 times the machine gel time of the second diamine.

With conventional diamine chain-extended RIM systems it is not possible to increase the ratio of extender equivalents to active hydrogen group-containing compound equivalents above certain levels without forming a polyurethane product which is brittle at demold. For example, in the standard 110–50 formulation, the ratio cannot be increased above about 7:1 without adverse results.

I have found that it is possible to increase the ratio of the number of equivalents of diamine chain extender to the number of equivalents of active hydrogen group-containing compound by using a mixture of diamine chain extenders whereby a polyurethane product may be formed which has excellent green strength for handling; i.e. to remove the product from the mold and optionally postcure it in a heating facility while maintaining excellent physical properties in the polyurethane product. Surprisingly, the combination of chain extenders not only serves to provide a reaction having a machine gel time somewhat slower than the first diamine so as to be able to fill very large molds such as body panels for automobiles, but also unexpectedly provides polyurethane products which have exceptionally high flexural modulus, this being very desirable for large molded polyurethane products.

The chain extender mixtures of the invention may be used in any of a variety of RIM systems including but not limited to the 50,000 psi modulus RIM system which is sometimes referred to as the Bayflex "110–50" formulation. Thus the chain extender mixtures of the invention when replacing a single aromatic diamine in a given RIM system, provide a polyurethane product having a superior flexural modulus. Of course the chain extender mixtures of the invention must be balanced such that the particular positional isomers and portion of each diamine chosen not only provide a suitable machine gel time for the RIM formulation and equipment being used so as to be able to fill a mold, preferably a large thin mold but also provide a product having good green strength. More desirably, the product has a superior flexural modulus.

The first aromatic diamine of the invention is any aromatic diamine having a faster machine gel time than the second aromatic diamine while providing a suitable machine gel time in the RIM formulation being used so as to be able to produce a RIM polyurethane product. Preferably, the first aromatic diamine of the invention has a machine gel time of about 1.0 to about 4.0 seconds in a 50,000 psi modulus RIM formulation reaction such that the combination of chain extenders then has a machine gel time in the RIM formulation reaction in which it is to be used of about 1 to 10 seconds, more preferably 1 to 5 seconds.

A preferred class of first, faster machine gel time, aromatic diamines of the invention are the alkylated mononuclear and dinuclear aromatic diamines. While the unalkylated m-phenylenediamine and methylenebisaniline may be used in a combination with certain second, slower diamines, the alkylated aromatic diamines are preferred as the first aromatic diamine of the invention. The alkyl groups of this class are preferably of 1 to 20 carbon atoms, more preferably 1 to 6 carbon atoms.

This preferred class of diamines of the invention includes the alkylated mono-nuclear aromatic diamines including the isomers of toluenediamine and the alkylated derivatives thereof. Thus, monoalkyldiaminobenzenes, dialkyldiaminobenzenes, trialkyldiaminobenzenes, tetraalkyldiaminobenzenes, as well as certain diamino aromatics of more than one ring are suitable as the first chain extender of the invention so long as they provide a reasonably fast machine gel time in a 50,000 psi modulus RIM formulation reaction.

The alkylated mononuclear aromatic diamines of the invention include the toluenediamines and alkylated toluenediamines such as 2,4-toluenediamine; 2,6-toluenediamine; 3,5-diethyl-2,4-diaminotoluene; 3,5-diethyl-2,6-diaminotoluene (DETDA); 2,4,6-triethyl-m-phenylenediamine (TEMPDA); 3,5-diisopropyl-2,4-diaminotoluene; 3,5-di-sec-butyl-2,6-diaminotoluene; 3-ethyl-5-isopropyl-2,4-diaminotoluene; 4,6-diisopropyl-m-phenylenediamine; 4,6-di-tert-butyl-m-phenylenediamine; 4,6-diethyl-m-phenylenediamine; 3-isopropyl-2,6-diaminotoluene; 5-isopropyl-2,4-diaminotoluene; 4-isopropyl-6-methyl-m-phenylenediamine; 4-isopropyl-6-tert-butyl-m-phenylenediamine; 4-ethyl-6-isopropyl-m-phenylenediamine; 4-methyl-6-tert-butyl-m-phenylenediamine; 4,6-di-sec-butyl-m-phenylenediamine; 4-ethyl-6-tertbutyl-m-phenylenediamine; 4-ethyl-6-sec-butyl-m-phenylenediamine; 4-ethyl-6-isobutyl-m-phenylenediamine; 4-isopropyl-6-isobutyl-m-phenylenediamine; 4-isopropyl-6-sec-butyl-m-phenylenediamine; 4-tert-butyl-6-isobutyl-m-phenylenediamine; 4-cyclopentyl-6-ethyl-m-phenylenediamine; 4-cyclohexyl-6-isopropyl-m-phenylenediamine; and 4,6-dicyclopentyl-m-phenylenediamine. The most preferred alkylated mononuclear aromatic diamines of the invention are the diethyltoluenediamines and mixtures of the positional isomers thereof. Preferred is the diamine mixture sold by Ethyl Corporation as diethyltoluene diamine.

Another preferred class of the first, faster aromatic diamines of the invention include the alkylated dinuclear aromatic diamines. These include the bridged and unbridged dianilines as well as bridged and unbridged compounds wherein both diamine functionalities are on one of the aromatic rings. More preferred, however, are the dinuclear aromatic diamines wherein one of the amino functions is on each of the aromatic rings. Still more preferred are those alkylated aromatic dianilines having a bridging group between the two aromatic nuclei. Bridging groups may include a wide variety of divalent atoms or groups such as carbonyl, $-C(CF_3)_2-$; $-S-$; $-SO_2-$; $-SO-$; $-SCH_2CH_2S-$;

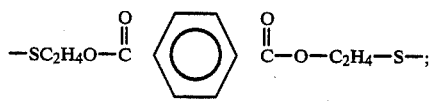

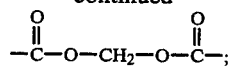

Preferred bridging groups are the alkylenes, arylenes, aralkylenes, and alkarylenes. Still more highly preferred are the alkylene bridging groups and most highly preferred is the methylene bridging group since it may readily be provided in a condensation reaction of formaldehyde and the anilines. The alkylated bisaniline compounds include those 2,2'-alkylene or alkylidene bis compounds; 4,4'-alkylene or alkylidene bis compounds; or 2,4'-alkylene or alkylidenebis compounds.

Compounds included in this class of first, faster, aromatic diamines of the invention are 2,2',6,6'-tetraethyl-4,4'-methylenebisaniline; 2,2',6,6'-tetraisopropyl-4,4'-methylenebisaniline (methylenebis diisopropylaniline); 2,2',6,6'-tetra-sec-butyl-4,4'-methylenebisaniline; 2,2'-dimethyl-6,6'-di-tert-butyl-4,4'-methylenebisaniline; 2,2'-di-tert-butyl-4,4'-methylenebisaniline; 2-isopropyl-2',6'-diethyl-4,4'-methylenebisaniline; and other alkylated bisaniline compounds.

While larger aromatic ring diamines may be used for either of the chain extenders of the invention, the diamines based on benzene rings are more highly preferred.

As can be seen from a review of the exemplary compounds listed above for the first, faster, aromatic diamines of the invention, those having an alkyl substituent ortho to each amino group are preferred. In some RIM systems, those having an alkyl group in each of the ortho positions to both of the amino groups are preferred. Thus, as can be seen from the above, the alkyl-substituted diaminobenzenes are a preferred class of the invention. Also, another preferred class of the invention are the alkyl-substituted 4,4'-methylenebisanilines.

The second aromatic diamines of the invention have a machine gel time in a 50,000 psi modulus RIM formulation reaction which is slower than the machine gel time of the first aromatic diamine of the chain extender mixture of the invention. Of course, it may be possible to identify a second aromatic diamine of the invention which has a faster gel time than a selected first aromatic diamine of the invention in a particular RIM formulation but of course, this combination would not be used to obtain polyurethanes according to the method of the invention. Rather, one would select a pair of diamines from those described such that the first aromatic diamine of the invention is faster in a RIM process than the second aromatic diamine of the invention. Since RIM formulation reactions and processes vary greatly in terms of reaction time, proportions, heating times, and other process factors, the skilled artisan need only appropriately draw from the disclosure of the present invention to provide a polyurethane in the manner described herein.

The second, slower aromatic diamines of the invention include those aromatic diamines which are alkylated with highly hindering groups which restrict the reactivity of the amino hydrogens such that the resultant machine gel time in a 50,000 modulus psi RIM formulation is slower than the selected first aromatic diamine for a particular process identified. Thus, an exemplary alkylated second aromatic diamine of the invention would be 1,3,5-tri-tert-butyl-2,4-diaminobenzene.

The second, slower, aromatic diamines of the invention include the halo substituted aromatic diamines. These include the ortho halo aromatic diamines such as methylenebisorthochloroaniline (MOCA) which is commonly used in cast elastomer formulations.

A preferred class of second, slower, aromatic diamines of the invention are the alkylthio substituted aromatic diamines. These include the alkylthio substituted aromatic diamines having one or more alkyl substituents as well. The alkylthio groups contain an alkyl group bound to the aromatic nucleus through a sulfur atom. The alkyl group may contain 1 to 50 carbon atoms of linear, cyclic, or branched structure, preferably 1 to 20 carbon atoms, more preferably 1 to 6 carbon atoms. The aromatic diamines may have one, two, or more aromatic rings. Where alkyl substituents are also present on the aromatic rings, the alkyl substituents may be the same or different alkyl, preferably of 1 to 20 carbon atoms, more preferably 1 to 6 carbon atoms. Other groups which do not adversely affect the polyurethane RIM reaction may also be present. Alternatively, the alkylthio aromatic diamines may also be substituted with aryl, alkaryl, aralkyl, alkenyl, or inorganic substituents such as halogen, nitro, alkoxy, carboalkoxy, etc. Among the polynuclear aromatic diamines having alkylthio substituents, those having an amino substituent on separate aromatic rings are preferred and those having an alkylthio substituent on said separate aromatic rings are also preferred. For dinuclear aromatic diamines having alkylthio substituents, the diamines may be directly bonded dinuclear compounds or may have a bridge which is preferably an alkylene or alkylidene such as methylene, ethylidene, propylene, isopropylidene, and the like, preferably methylene. In one preferred embodiment, the dinuclear aromatic diamine has two alkylthio substituents on the same aromatic ring with one of the amino groups.

It is highly preferred that at least one of the alkylthio groups be positioned ortho to one of the amino substituents in the aromatic diamines of this class of the invention.

The alkyl substituents and the alkyl portion of the alkylthio substituents of this class of second diamine chain extenders of the invention (as well as the first aromatic diamines of the invention) may be acyclic or cyclic entities. These include methyl, ethyl, isopropyl, sec-butyl, tert-butyl, pentyl, n-hexyl, cyclopentyl, cyclohexyl, dodecyl, eicosyl, and many other alkyls and cycloalkyls. Mixtures of positional isomers of the alkylthio substituted aromatic diamines of the invention as well as mixtures of mono, di, and tri alkylthio substituted aromatic diamines are usable as the second, slower, aromatic diamine of the invention.

The second, slower, aromatic diamines of the invention include the following exemplary compounds:
3,5-di(ethylthio)-2,4-diaminotoluene;
4,4'-ethylidenebis[2,6-di(methylthio)aniline];
4,4'-methylenebis[2,6-di(ethylthio)aniline];
1,4-diamino-2,3-di(methylthio)naphthalene;
2,6-di(methylthio)-4-aminomethylaniline;
4,4'-[2,6-di(ethylthio)aminophenyl][2-ethyl-6-(methylthio)aminophenyl]methane;
3-(methylthio)-5-(ethylthio)-2,4-diaminochlorobenzene;
6-nitro-3,5-di(methylthio)-2,4-diaminotoluene;
6-carbomethoxy-3,5-di(propylthio)-2,4-diaminoethylbenzene;
3,5-di(methylthio)-2,4-diamino-ethoxybenzene;
2,2'-methylenebis [4,6-di(methylthio)aniline];
3,3',5-tri(methylthio)-4,4'-diamino-diphenylmethane;
4,4'-diamino-3,3',5,5'-tetra(methylthio) biphenyl;
3,5-di(methylthio)-2,4-diaminotoluene;
3-(methylthio)-5-(ethylthio)-2,4-diaminotoluene;
2,4-di(methylthio)-meta-phenylenediamine;
4,6-di(methylthio)-meta-phenylenediamine;
2,4,6-tri(methylthio)-meta-phenylenediamine;
2,4-di(ethylthio)-meta-phenylenediamine;
4,6-di(ethylthio)-meta-phenylenediamine;
2,4-di(n-butylthio)-meta-phenylenediamine;
2,5-di(methylthio)-meta-phenylenediamine;
2-(methylthio)-4-(ethylthio)-meta-phenylenediamine;
3,5-di(methylthio)-2,4-diaminotoluene;
3,5-di(ethylthio)-2,4-diaminotoluene;
3,5-di(methylthio)-2,6-diaminotoluene;
3,5-di(propylthio)-2,6-diaminotoluene;
3-(methylthio)-5-(ethylthio)-2,4-diaminotoluene;
3,5-di(methylthio)-2,4-diamino-ethylbenzene;
3,5-di(ethylthio)-2,6-diamino-ethylbenzene;
3,5-di(cyclohexylthio)-2,4-diaminotoluene;
3-(methylthio)-5-(propylthio)-2,6-diamino-ethylbenzene;
3,5-di(methylthio)-2,4-diamino-chlorobenzene;
3,6-di(ethylthio)-2,4-diamino-chlorobenzene;
4,4'-methylenebis[2,6-di(methylthio)aniline];
[3,5-di(methylthio)-4-aminophenyl][3-(methylthio)-4aminophenyl]methane;
4,4'-ethylidenebis[2,6-di(ethylthio)aniline];
4,4'-isopropylidenebis[2,6-di(methylthio)aniline];
[3,5-di(methylthio)-4-aminophenyl][3,5-di(ethylthio)4-aminophenyl]sulfide;
phenyl[3,5-di(methylthio)-2,4-diaminophenyl]methane;
2,6-diamino-3,5-di(n-butylthio)-4-bromotoluene; and
[3,5-di(methylthio)-4-aminophenyl][3,5-di(ethylthio)4-aminophenyl]ether.

The most preferred alkylthio aromatic diamines of the invention are 1-methyl-3,5-dimethylthio-2,4-diaminobenzene; 1-methyl-3,5-dimethylthio-2,6-diaminobenzene; and mixtures thereof.

The aromatic diamines of the invention are mixed in such proportion that an acceptable machine gel time is obtained for the particular RIM formulation reaction chosen. A preferred machine gel time for such RIM reactions is about 2.5 to about 10 seconds, more preferably 3 to 7 seconds, more preferably about 3 to 5 seconds. Thus, the first and second aromatic diamines of the invention are blended in such proportion relative to each other and relative to the active hydrogen-group-containing compound so as to provide an appropriate machine gel time in the RIM formulations in which they are applied while providing a polyurethane having green strength such that it may be handled at demold without sagging, collapsing, cracking, breaking, tearing, chipping, or shattering. When this is accomplished, the polyurethane product of the invention has a surprisingly good flexural modulus and other desirable physical properties. Thus, the first and second aromatic diamines of the invention may be mixed in any proportion which accomplishes the RIM reaction and provides an acceptable polyurethane. However, a blend of about 30% to about 70% of the total combined diamine chain extender mixture as the first aromatic diamine is usually preferred. A preferred embodiment for many RIM formulation reactions is a molar blend of about 50% of each of the first and second aromatic diamines of the invention wherein about 90% of the combined amino groups and active hydrogen groups are aminos from the diamine chain extender mixture (9:1 ratio).

A very highly preferred combination of first and second aromatic diamines of the invention is (a) a mixture of 50 mole percent DETDA (the commercial formulation of about 76% 3,5-diethyl-2,4-diaminotoluene and 24% 3,5-diethyl-2,6-diaminotoluene) and 50 mole percent dimethylthio-toluenediamine (about 70% 3,5-(methylthio)-2,4-diaminotoluene; about 23% 3,5-di(methylthio)-2,6-diaminotoluene; about 3% tri(methylthio)-m-phenylenediamine; and about 4% mono(methylthio)-diaminotoluene). This preferred combination may be used in various RIM formulations such that a machine gel time is obtained so that large molds may be filled and a polyurethane product having good green strength for subsequent handling is obtained. Furthermore, the process may be carried out in formulations such that an unexpectedly good flexural modulus and other physical properties are obtained. In a formulation such as the Bayflex 110-50 formulation of Mobay Chemical Company, formulations may be used wherein the preferred chain extender mixture comprises about 25-45 weight percent, preferably about 28 to 30 weight percent of the resin stream which includes the active hydrogen group-containing compound. In highly preferred formulations, the ratio of isocyanate-reactive aminos from the chain extender to active hydrogen groups from the active-hydrogen group-containing compound is about 9:1 rather than lower. The flexural modulus obtained are exceptionally high. The machine gel time for the RIM formulation and preferred chain extender mixture is about 3.2 to 3.5 seconds depending upon the weight percent chosen for the preferred chain extender mixture.

Another highly preferred combination of first and second aromatic diamine chain extenders of the invention is an equimolar mixture of the dimethylthio diaminotoluene component of the above mixture as the second, slower, aromatic diamine with 2,2',6,6'-tetraisopropyl-4,4'-methylenebisaniline. This combination in a 110-50 formulation wherein the chain extender mixture is about 45 weight percent of the resin stream containing the active hydrogen group containing compound (polyol) provides a reaction mixture having a machine gel time of about 2.2 seconds, providing polyurethane products with excellent green strength for subsequent handling and having a flexural modulus at 75° C. of about 100,000 psi.

A third highly preferred combination of chain extenders also providing a polyurethane product having good green strength with an unexpectedly high flexural modulus and an acceptable machine gel time of about 3.6 seconds in a 110-50 formulation reaction is the equimolar combination of an alkylated diaminobenzene and an ethylenebis (haloaniline) such as TEMPDA and MOCA or DETDA and MOCA wherein the combination of chain extenders comprises about 40 weight percent or more of the resin stream.

A better understanding of the invention may be had by a review of the following non-limiting examples of the preferred embodiments of the invention.

In the following Comparative Examples and Example of the RIM process of the invention, a commercial polyol, Mobay Chemical Company's Multranol TM M-3901 polyol (molecular weight 4000, equivalent weight 2000), was admixed with the chain extender and a small portion of catalyst, M and T's T-12 dibutyl tin dilaurate, to form a resin in the recirculating system of a Martin-Sweets Company mini-RIM machine that provides a stream to the mixing head of the RIM machine.

The resin was recirculated with heating at about 110° F. (45° C.) as required to bring the viscosity of the resin to an appropriate level for mixing with polyisocyanate in the mixing head by the static impingement mixing method. The commercial MDI-type isocyanate Mondur PF from Mobay Chemical Co., having an equivalent weight of 184, was used in such proportion that the reactive isocyanate sites thereon were present in slight excess of the combined reactive sites on the polyol and reactive sites (aminos) on the diamine chain extender in each example (isocyanate index 1.05) with one exception. Example 1, run (f), had an isocyanate index of 1.02.

A shot of the reaction mixture was in each case injected into a three-inch by eight-inch rectangular mold having a thickness of about ⅛ inch with a shot time of about 1.2 seconds. The mix head temperature was about 95°-115° F. and the mold temperature was about 150° F. The reaction proceeded rapidly in each instance of the examples. The plaques were removed after 30 seconds and postcured for 1 hour at 250° F.

COMPARATIVE EXAMPLE A

The mini-RIM machine was operated using a typical 50,000 psi modulus RIM formulation with the commercial chain extender DETDA, a mixture of about 76% 2,4-diamino-3,5-diethyltoluene and about 24% 2,6-diamino-3,5-diethyltoluene (containing about 1% mono-ethyltoluenediamine. A resin stream mixture was formed using 76.8 weight percent polyol, 23 weight percent DETDA, 0.1 weight percent tin catalyst, and 0.1 weight percent DABCO 33 LV (solution of DABCO in dipropylene glycol). In this formulation about 87% of the isocyanate-reactive hydrogen groups in the resin are aminos from the chain extender. A large portion of the resin mixture was supplied to the machine for recirculation, heating, static impingement mixing, calibration, and injection of a shot. A sufficient portion of Mobay Chemical Company's Mondur PF MDI isocyanate was supplied to the other stream of the mini-RIM machine for static impingement mixing with the resin composition described above. When the recirculating resin, mix head, and mold were at the appropriate temperatures, a shot was injected into the mold and after 30 seconds, the molded polyurethane product was removed therefrom, placed in a 250° F. oven for 1 hour, removed and stored in an ASTM atmosphere for at least 24 hours before testing for physical properties.

In an attempt to increase the flexural modulus and/or decrease the gel time of the injected shot, the portion of DETDA chain extender was varied in two subsequent runs such that the weight percent of the DETDA present was, in the first instance, 28 weight percent and, in the second instance, 18 weight percent. In these two formulations, about 90% and 85%, respectively, of the isocyanate-reactive hydrogen groups are aminos from the chain extender.

For the typical 50,000 psi modulus RIM formulation (23 weight percent DETDA chain extender) described above, the polyurethane product had good green strength at demold and was not brittle. The run with only 18 weight percent chain extender was not brittle at demold but suffered from a very low flexural modulus and had a gel time so fast that large molds could not be filled. The run with 28 weight percent DETDA chain extender had a somewhat increased flexural modulus but the polyurethane product was extremely brittle at demold and could not be handled to remove it from the mold without breaking the product. Thus the formed product was unacceptable and would require extreme care to be postcured in its formed shape.

COMPARATIVE EXAMPLE B

In the same fashion as with Comparative Example A and using approximately the same proportion of components, the mini-RIM machine was used to form three polyurethane products from compositions having 19.45, 24.7, and 30 weight percent triethyl m-phenylenediamine. This corresponds to about 85%, 87% and 90% of the isocyanate-reactive hydrogen groups being aminos from the chain extender (5.7:1; 6.7:1, and 9:1). The run using 24.7% tri-ethyl m-phenylenediamine had a typical flexural modulus. The run with 19.45 weight percent triethyl m-phenylenediamine had a favorably slightly slower gel time to be able to fill a larger mold but had an unacceptably low flexural modulus. The run with 30 weight percent triethyl m-phenylenediamine provided a polyurethane with an improved flexural modulus but was too brittle at demold to be able to handle without breaking the green product. That is, it had no "green strength".

COMPARATIVE EXAMPLE C

The dialkylthio aromatic diamine chain extender which comprises about 4 parts 3,5-dimethylthio-2,4-diaminotoluene and about 1 part 3,5-dimethylthio-2,6-diaminotoluene was used in a 50,000 modulus psi formulation in the mini-RIM machine in the same manner as the preceeding examples. In a first run, 26.8 weight percent of the dialkylthio diamine chain extender (mixture of isomers) (87% of isocyanate-reactive groups are aminos of the extender; 6.7:1) was used to form a polymer. The gel time of the injected shot was too slow for commercial purposes at 15 seconds and provided an unacceptably low flexural modulus from a polyurethane product which was too soft to hold its shape at demold. Similarly, in a second run using 34.9 weight percent of the mixture of isomers of dialkylthio diamine chain extender (91% of the isocyanate-reactive groups are aminos of the chain extender, ratio of aminos to hydroxyls of the polyol is about 10.1:1), the flexural modulus was very high for a postcured polyurethane product but the formed product was unacceptably soft at demold after a 15 second gel time. Furthermore, the postcured polyurethane product was weak and easily broken after the cure.

An attempt was made to form a polyurethane product using the chain extender methylenebis ortho-chloroaniline (MOCA) at a 31.3 weight percent level (82% of the isocyanate-reactive groups are aminos of the chain extender; 6.7:1) in the resin as described above. The gel time for the shot from the mini-RIM machine was too slow at about 25 seconds. Although the formed product had a good flexural modulus, it was unacceptably soft and formable at demold and had to be supported to hold its shape.

EXAMPLE 1

Using the apparatus and procedure described above, a polyurethane product was formed from a resin having 24.8 weight percent diamine from a diamine mixture of the invention comprising 50 mole percent of the commercially available mixture of DETDA isomers and 50 mole percent of the mixture of positional isomers of dimethylthio toluenediamine described above in Comparative Example C. In this formulation, 87% of the active hydrogen groups in the resin stream were aminos from the chain extender mixture. The gel time of the shot from the RIM machine was about 3.5 seconds and a polymer having an acceptable flexural modulus was formed (see (a) in Table I). The composition of the resin mixture was changed so as to increase the weight percent of the mixture of diamines to 30.2 and 31.2 weight percent. This corresponds to about 89 and 90 percent aminos as reactive hydrogen groups in the resin stream (8.1:1 and 10:1). Two runs (b) and (c) were made using 30.2 weight percent diamine and three runs (d), (e), and (f) were made using 31.2 weight percent diamine.

In the first run with 30.2 weight percent diamine mixture the density of the polyurethane mixture in the mold was about 0.90 grams per cubic centimeter (g/cc). In the second run at 30.2 weight percent diamine mixture the density of the product was 0.99 g/cc. All of the remaining runs were formed with the clamps on the mold such that the density of the formed polyurethane was at least about 1.0 g/cc. The runs with an increased portion of diamine mixture had high flexural modulus with 3.1 to 3.6 seconds gel times.

EXAMPLE 2

Using the apparatus and procedure described above a mixture of 50 mole percent DETDA and 50 mole percent MOCA were combined in a resin composition such that the diamine mixture comprised 30.7% diamine. Thus, 89% of the isocyanate-reactive groups in the resin stream are aminos from the diamine chain extender mixture. That is, the ratio of aminos to active hydrogen groups from the active hydrogen group-containing compound (whether hydroxyl groups as here, or aminos from an amine terminated polyether/polyester, or otherwise) is about 8:1. A polyurethane product having a very high flexural modulus was formed from a shot of the reaction mixture having a gel time of 3.6 seconds.

EXAMPLE 3

In the same fashion as the previous examples, a 50 mole percent mixture of 4,4'-methylenebis(2,6-diisopropylaniline) and 50 mole percent dimethylthio toluenediamine was formed wherein the diamine combination comprised 45.03 weight percent of the resin composition (92% of the isocyanate-reactive groups in the resin are extender amino; 11.5:1). As can be seen from the table below a polymer was provided having an especially good flexural modulus from an injection shot having an acceptable gel time of 2.2 seconds. By proper selection of the other components of the process and a slight variation of the chain extender mixture, a somewhat longer gel time may readily be achieved.

EXAMPLE 4

The chain extender mixture of Example 1 was used in the mini-RIM machine with a 35,000 psi modulus amine-terminated polyol system. The resin used was Texaco's trifunctional T5000 amine-terminated polyol having an equivalent weight of 1666. No catalyst was used. The diamine extender mixture formed about 46 weight percent of the resin stream (9:1 ratio of extender aminos to polyol aminos). A comparable formulation (same portion of isocyanate-reactive groups—90%) using DETDA only as the chain extender was brittle at demold with a gel time of less than one second. The mixture of the invention formed a strong part at demold in 30 seconds.

TABLE I

| EXAMPLE | | GEL TIME | FLEXURAL MODULUS AT 75° F. | DEMOLD CONDITION |
|---|---|---|---|---|
| Comparative | | 1.9 (fast) | 22000 (low) | strong |
| Example A | | 1.8 (fast) | 49000 | strong |
| | | 1.8 (fast) | 66000 | brittle |
| Comparative | | 2.2 | 28000 (low) | strong |
| Example B | | 2.0 (fast) | 55000 | strong |
| | | 2.0 (fast) | 77000 | brittle |
| Comparative | | 15 (slow) | 40000 | soft |
| Example C | | 15 (slow) | 101000 | soft & weak |
| Example 1 | (a) | 3.2 | 43000 | strong |
| | (b) | 3.5 | 77000 | strong |
| | (c) | 3.5 | 88000 | strong |
| | (d) | 3.6 | 83000 | strong |
| | (e) | 3.6 | 102000 | strong |
| | (f) | 3.6 | 87000 | strong |
| Example 2 | | 3.6 | 91000 | strong |
| Example 3 | | 2.2 | 99000 | strong |
| Example 4 | | 3.0 | 83000 | strong |

TABLE II below presents the excellent physical properties of polyurethanes of the invention. An entry for typical data on a conventional 100% DETDA chain extender are included as the first entry in the table, for comparison.

TABLE II

| Example | | Tensile Strength (psi) | 4" Heat Sag @ 250° F. | Die C Tear (pli) | Elong- % @ Break |
|---|---|---|---|---|---|
| DETDA[1] | | 3841 | .063 | 432 | 190 |
| Example 1 | (a) | 2800 | 0.210 | 480 | 225 |
| | (b) | — | .015 | — | — |
| | (c) | 3850 | .020 | 650 | 220 |
| | (d) | 3596 | .082 | 731 | 205 |
| | (e) | 4590 | .040 | 770 | 240 |
| | (f) | 4270 | .160 | 740 | 290 |
| Example 2 | | 4755 | .241 | 750 | 150 |
| Example 3 | | 3790 | .005 | 670 | 145 |
| Example 4 | | 4202 | +.200 (curl) | 514 | 140 |

[1]50,000 psi RIM formulation

Additional runs with the extenders of Example 1 were made with 32.8 and 35.4 weight percents diamine corresponding to 92 and 93 percent extender aminos (11.5:1 and 13.3:1) but these proved to increase the brittleness of the product above a point where the molded products could be handled without breakage. With other mixtures of diamines, such ratios may provide acceptable products.

A formulation of resin comprising 70 mole percent of the commercial chain extender DETDA and 30 mole percent of the dimethylthio toluenediamine chain extender of Comparative Example C was run in the mini-RIM machine wherein the diamine mixture comprised 29.3 weight percent of the resin (90% extender aminos). The gel time for this shot was an acceptable 3 seconds and the flexural modulus at 75° F. was an acceptable 80,000 psi, however the product was brittle at demold and could not be handled for postcure without breaking. Accordingly, slightly more of the dimethylthio toluenediamine product was needed in this formulation of this particular polyol and polyisocyanate reaction mixture in order to form a non-brittle product. Using other polyisocyanates and other active hydrogen group-containing compounds in the resin stream, a suitable product may be formed with an acceptable gel time and high flexural modulus.

Two runs were carried out using 30 mole percent DETDA and about 70 mole percent of the dimethylthio toluenediamine chain extender mixture described above to form a polyurethane product. The weight percent of the diamine mixture in the resin was 31.0 and 36.3 in the two cases (90 and 92% extender aminos). The gel times were an acceptable 6.0 and 5.4 seconds with high flexural modulus at 75° F. of 69,000 psi and 98,000 psi. However, in each case the polyurethane product formed was brittle at demold and the product having 36.3 weight percent extender was somewhat weak. Products with somewhat more DETDA in the diamine mixture should be acceptable in this particular RIM formulation with this particular active hydrogen group-containing compound, isocyanate, and cure conditions.

Using the procedure and equipment described in the examples a chain extender mixture of 50 mole percent DETDA and 50 mole percent monomethylthio toluenediamine was formulated and incorporated in a resin at the level of 27.6 weight percent (90% aminos in resin stream). The shot from the RIM machine had a gel time of 2.2 seconds and formed a polymer with an acceptably high flexural modulus but which was brittle at demold.

This mixture of extenders may be used with a slightly varied mixture of the two diamines and/or different weight percent extender to obtain suitable products of high modulus and good gel times (about 3–10 seconds).

Although the invention has been described in detail in the foregoing for the purpose of illustration, it is to be understood that such detail is solely for that purpose and that variations can be made by the skilled artisan without departing from the scope or spirit of the invention as set forth in the claims.

I claim:
1. A polyurethane formed by reaction of:
    (a) an organic active hydrogen group-containing compound;
    (b) an organic polyisocyanate; and
    (c) a chain extender mixture comprising:
        (i) a first aromatic diamine having a machine gel time of about 1.0 to about 4.0 seconds in a 50,000 psi modulus RIM formulation reaction: and
        (ii) a second aromatic diamine having a machine gel time in a 50,000 psi modulus RIM formulation reaction of about 1.5 to 15 times the machine gel time of said first aromatic diamine;
said polyurethane having non-brittle, rigid green strength after reaction and having a flexural modulus of at least about 50,000 psi at 75° F.

2. The polyurethane of claim 1 wherein said first aromatic diamine has an alkyl substituent ortho to each amino group.

3. The polyurethane of claim 2 wherein said first aromatic diamine has an alkyl substituent in each position ortho to at least one amino group.

4. The polyurethane of claim 3 wherein said first aromatic diamine has an alkyl substituent in each position ortho to both amino groups.

5. The polyurethane of claim 2 wherein said first aromatic diamine is an alkyl-substituted diaminobenzene.

6. The polyurethane of claim 5 wherein said alkyl-substituted diaminobenzene is 1-methyl-3,5-diethyl-2,4-diaminobenzene; 1-methyl-3,5-diethyl-2,6-diaminobenzene; or a mixture thereof.

7. The polyurethane of claim 2 wherein said first aromatic diamine is an alkyl-substituted 4,4'-methylenebisaniline.

8. The polyurethane of claim 7 wherein said alkylsubstituted 4,4'-methylenebisaniline is 2,2',6,6'-tetraisopropyl-4,4'-methylenebisaniline.

9. The polyurethane of claim 1 wherein said second aromatic diamine has at least one alkylthio substituent ortho to at least one amino group.

10. The polyurethane of claim 9 wherein said second aromatic diamine is 1-methyl-3,5-dimethylthio-2,4-diaminobenzene; 1-methyl-3,5-dimethylthio-2,6-diaminobenzene; or a mixture thereof.

11. The polyurethane of claim 1 wherein said second aromatic diamine has at least one halo substituent ortho to each amino group.

12. The polyurethane of claim 11 wherein said second aromatic diamine is 2,2'-dichloro-4,4'-methylenebisaniline.

13. A process for preparing a RIM polyurethane molded product, said process comprising the steps of:
  (a) at a temperature of about 15°-100° C., subjecting to static impingement mixing
    (i) an organic polyisocyanate,
    (ii) an organic active hydrogen group-containing compound, and
    (iii) a chain extender mixture comprising a first aromatic diamine having a machine gel time of about 1.0 to 4.0 seconds in a 50,000 psi modulus RIM formulation reaction and a second aromatic diamine having a machine gel time in a 50,000 psi modulus RIM formulation reaction of about 1.5 to about 15 times the machine gel time of said first aromatic diamine, whereby a liquid mixture is produced;
  (b) injecting a shot of said liquid mixture into a closed mold preheated to about 15°-100° C. and forming a polyurethane molded product having rigid, non-brittle green strength and a flexural modulus at 75° F. of at least about 50,000 psi;
  (c) opening the mold and removing the formed polyurethane molded product; and
  (d) optionally, postcuring said molded product at 50°-200° C.

14. The process of claim 13 wherein said chain extender mixture has a machine gel time in said process of about 2.5 to about 10.0 seconds.

15. The process of claim 13 wherein the amount of said chain extender mixture is about 5-40 weight percent of the total weight of components (i), (ii), and (iii) and wherein the ratio of isocyanate groups on the one hand to combined active hydrogen groups and amino groups on the other hand is about 0.90 to 1.10.

16. The process of claim 13 wherein the ratio of amino groups of said chain extender mixture of aromatic diamines to active hydrogen groups of said active hydrogen group-containing compound is at least about 8:1.

17. The process of claim 13 wherein said first aromatic diamine has an alkyl substituent ortho to each amino group.

18. The process of claim 17 wherein said first aromatic diamine is a member selected from the group consisting of 1-methyl-3,5-diethyl-2,4-diaminobenzene; 1-methyl-3,5-diethyl-2,6-diaminobenzene; 1,3,5-triethyl-2,6-diaminobenzene; and 2,2',6,6'-tetraisopropyl-4,4'-methylenebisaniline.

19. The process of claim 13 wherein said second aromatic diamine has at least one alkylthio substituent ortho to at least one amino group.

20. The process of claim 13 wherein said second aromatic diamine has at least one halo substituent ortho to each amino group.

21. The process of claim 20 wherein said second aromatic diamine is 2,2'-dichloro-4,4'-methylenebisaniline.

22. The process of claim 13 wherein said active hydrogen group-containing compound is an amine terminated polyether.

23. The process of claim 13 wherein said active hydrogen group-containing compound is an organic polyol having hydroxyl groups and being in the molecular weight range of 400-7000, and wherein also subjected to said static impingement mixing is a catalyst for reaction between said hydroxyl groups and isocyanate groups.

24. A polyurethane RIM process comprising:
  (a) at a temperature of about 15°-100° C. subjecting to static impingement mixing two liquid streams, a first stream comprising
    (i) an organic polyisocyanate or prepolymer or quasi-prepolymer formed from an organic polyisocyanate and an organic active hydrogen group-containing compound; and a second stream comprising
    (ii) either (1) an organic polyol having a molecular weight of about 400-7000 combined with a catalyst for reaction between hydroxyl groups and isocyanate groups, or (2) an amine terminated polyether or polyester and
    (iii) a chain extender mixture of a first aromatic diamine selected from 2,2',6,6'-tetraisopropyl-4,4'-methylenebisaniline; 1-methyl-3,5-diethyl-2,4-diaminobenzene; 1-methyl-3,5-diethyl-2,6-diaminobenzene; 1,3,5-triethyl-2,6-diaminobenzene; and mixtures thereof; and a second chain extender selected from 1-methyl-3,5-dimethylthio-2,4-diaminobenzene; 1-methyl-3,5-dimethylthio-2,6-diaminobenzene; 2,2'-dichloro-4,4'-methylenebisaniline; and mixtures thereof, whereby a liquid mixture is produced, said mixture having a machine gel time in said process of about 2.5 to about 10 seconds;
  (b) injecting a shot of said liquid mixture into a closed mold preheated to about 15°-100° C.;
  (c) opening the mold and removing a molded product having rigid, non-brittle green strength and a flexural modulus at 75° F. of at least about 50,000 psi; and
  (d) optionally postcuring said product at 50°-200° C.; the amount of said chain extender mixture comprising about 5-40 weight percent of the total weight of components (i), (ii), and (iii) and the ratio of isocyanate groups to combined hydroxyl groups and amino groups being about 0.90 to 1.10.

25. The process of claim 24 wherein said first aromatic diamine is a mixture of 1-methyl-3,5-diethyl-2,4-diaminobenzene and 1-methyl-3,5-diethyl-2,6-diaminobenzene and said second aromatic diamine is a mixture of 1-methyl-3,5-dimethylthio-2,6-diaminobenzene and 1-methyl-3,5-dimethylthio-2,4-diaminobenzene.

26. The process of claim 24 wherein said first aromatic diamine is 2,2',6,6'-tetraisopropyl-4,4'-methylenebisaniline and said second aromatic diamine is a mixture of 1-methyl-3,5-dimethylthio-2,6-diaminobenzene and 1-methyl-3,5-dimethylthio-2,4-diaminobenzene.

27. The process of claim 24 wherein said first aromatic diamine is a mixture of 1-methyl-3,5-diethyl-2,4-diaminobenzene and 1-methyl-3,5-diethyl-2,6-diaminobenzene and said second aromatic diamine is 2,2'-dichloro-4,4'-methylenebisaniline.

28. The process of claim 24 with about equimolar parts of said first aromatic diamine and said second aromatic diamine.

29. A chain extender composition comprising a mixture of a first aromatic diamine having a machine gel time of about 1.0 to about 4.0 seconds in a 50,000 psi modulus RIM formulation reaction and a second aromatic diamine having a machine gel time in a 50,000 psi modulus RIM formulation of about 1.5 to 15 times that of said first diamine.

30. The composition of claim 29 wherein said first diamine is selected from 2,2',6,6'-tetraisopropyl-4,4'-methylenebisaniline; 1-methyl-3,5-diethyl-2,4-diaminobenzene; 1-methyl-3,5-diethyl-2,6-diaminobenzene; 1,3,5-triethyl-2,6-diaminobenzene and wherein said second diamine is selected from 1-methyl-3,5-dimethylthio-2,4-diaminobenzene; 1-methyl-3,5-dimethylthio-2,6-diaminobenzene; 2,2'-dichloro-4,4'-methylenebisaniline;

31. The composition of claim 29 wherein said first diamine comprises about 30–70 molar percent of said mixture and said second diamine comprises the remainder of said mixture.

32. An isocyanate-reactive resin stream composition comprising:
(i) an organic active hydrogen group-containing compound having a molecular weight of about 400 to 7000;
(ii) a first aromatic diamine having a machine gel time of about 1.0 to about 4.0 seconds in a 50,000 psi modulus RIM formulation reaction; and
(iii) a second aromatic diamine having a machine gel time in a 50,000 psi modulus RIM formulation reaction of about 1.5 to about 15 times the machine gel time of said first aromatic diamine, wherein the ratio of (a) amino groups from said first aromatic diamine and said second aromatic diamine to (b) active hydrogen groups from said organic active hydrogen group-containing compound is at least about 8:1.

33. The polyurethane of claim 10 wherein said first aromatic diamine is 1-methyl-3,5-diethyl-2,4-diaminobenzene; 1-methyl-3,5-diethyl-2,6-diaminobenzene or a mixture thereof.

34. A process of claim 13 wherein said first aromatic diamine is 1-methyl-3,5-diethyl-2,4-diaminobenzene; 1-methyl-3,5-diethyl-2,6-diaminobenzene or a mixture thereof and said second aromatic diamine 1-methyl-3,5-dimethylthio-2,4-diaminobenzene; 1-methyl-3,5-dimethylthio-2,6-diaminobenzene or a mixture thereof.

35. A composition of claim 29 wherein said first aromatic diamine is a mixture of 1-methyl-3,5-diethyl-2,4-diaminobenzene and 1-methyl-3,5-diethyl-2,6-diaminobenzene and said second aromatic diamine is a mixture of 1-methyl-3,5-dimethylthio-2,4-diaminobenzene; 1-methyl-3,5-dimethylthio-2,6-diaminobenzene.

* * * * *